United States Patent
Bergerhoff et al.

[15] 3,681,477
[45] Aug. 1, 1972

[54] CYCLIC PHOSPHOROUS ACID ESTERS AND PROCESS

[72] Inventors: Gunter Bergerhoff, Lengsdorf; Bela Tihanyi, Bonn; Jurgen Falbe, Dinslaken; Jurgen Weber; Werner Weisheit, both of Oberhausen-Holten, all of Germany

[73] Assignee: Ruhrchemie Aktiengesellschaft, Oberhausen-Holten, Germany

[22] Filed: Nov. 1, 1968

[21] Appl. No.: 772,841

[30] Foreign Application Priority Data

Nov. 7, 1967 Germany............P 16 68 623.0
July 15, 1968 Austria.....................A 6801/68

[52] U.S. Cl................260/927 R, 260/968, 260/972, 424/204
[51] Int. Cl..................................................C07f 9/28
[58] Field of Search..................260/927 R, 968, 972

[56] References Cited

UNITED STATES PATENTS 3,014,947   12/1961   Birum........................260/972 X
3,488,732   1/1970   Heiba et al................260/927 X

*Primary Examiner*—Lewis Gotts
*Assistant Examiner*—Richard L. Raymond
*Attorney*—Burgess, Dinklage & Sprung

[57] ABSTRACT

Novel organic phosphorus compounds containing at least one phosphorus atom, which may be present in the trivalent state, at least two carboxylic acid ester groups and a phosphorus to carbon double linkage prepared by reacting a malonic acid diester with a compound of trivalent phosphorus having directly linked to the phosphorus atom at least two halogen atoms capable of reacting with activated hydrogen atoms. (The reaction malonic acid diethyl ester with phenyl phosphine dichloride and the resulting reaction product are not within the scope of the instant invention).

The novel organic phosphorus compounds of the invention are useful as pest controlling agents, as catalyst components and for forming complexes with transition metals and their compounds.

The disclosed compounds include derivatives of 1,2-diphosphacyclopentene-(5)-one-(4) having the formula:

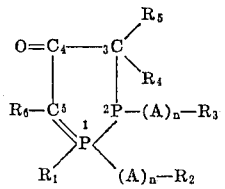

wherein $R_1$ represents an aliphatic, cycloaliphatic, heterocyclic or aromatic radical linked to the nucleus via an oxygen atom, $R_2$ and $R_3$ each represent aliphatic, cycloaliphatic, heterocyclic or aromatic radicals, which may be linked to the nucleus via a bridge atom A selected from the group of oxygen, sulfur, nitrogen, and phosphorus, $n$ is an integer having a value of 0 or 1 if the bridge atom is oxygen and if the bridge atom is sulfur, nitrogen or phosphorus $n$ has a value of 0, 1 or 2, and $R_4$, $R_5$ and $R_6$ each stand for a carboxylic acid ester group.

20 Claims, No Drawings

CYCLIC PHOSPHOROUS ACID ESTERS AND PROCESS

This invention relates to novel organic phosphorus compounds, which contain at least one phosphorus atom which may be present in the trivalent state, at least two carboxylic acid-ester groups and a phosphorus to carbon double linkage in their molecule and to a method of preparing the same.

In copending U.S. Pat. Application Ser. No. 765,687 filed Oct. 7, 1968 there is described the reaction of malonic acid diethylester with phenylphosphine dichloride in the presence of a basic reacting material and preferably in the presence of an organic solvent. The resulting phosphorus compound is advantageously separated from the hydrohalogenide of the base by fractional crystallization or extraction.

In accordance with the present invention it has been found that not only the two individual compounds hereinbefore mentioned can be reacted, but that other malonic acid diesters and other compounds of trivalent phosphorus can be successfully reacted to form a novel group of compounds.

It thus has been found according to the invention that novel organic phosphorus compounds, containing at least one phosphorus atom, which may be present in the trivalent state, at least two carboxylic acid ester groups and a phosphorus to carbon double linkage may be prepared by reacting a malonic acid diester with a compound of trivalent phosphorus having directly linked to the phosphorus atom at least two halogen atoms capable of reacting with activated hydrogen atoms preferably in the presence of an organic solvent. The reaction of malonic acid diethylester with phenyl phosphine dichloride described in copending application Ser. No. 765,687 and the reaction product thereof is excluded from the scope of the instant invention.

The malonic acid diesters suitable for use in the process of the invention include esters of aliphatic, cycloaliphatic, heterocyclic and aromatic alcohols, wherein the aliphatic alcohols employed as esterification components preferably contain one to 20 carbon atoms. Cycloaliphatic alcohols containing five to 20 carbon atoms are particularly valuable as ester constituents, while heterocyclic alcohols having up to 20 carbon atoms and aromatic alcohols having six to 20 carbon atoms are preferred.

The hydrogen halide evolved during the conversion is advantageously continuously removed from the reaction mixture by reaction with basic reacting materials. According to a specific embodiment of the invention, the hydrogen halide can also be continuously removed from the reaction mixture by introduction of inert gases.

The reaction is preferably carried out in a reaction medium, which dissolves the starting materials but in which the reaction product is not soluble. Hexane has proved to be particularly well suited for this purpose. If a solvent reaction medium is used, it is removed after completion of the reaction by the conventional method. The remaining residue is extracted with a suitable solvent, preferably benzene, from which the resulting phosphorus compound can then be easily isolated.

According to another embodiment of the invention the reaction is carried out in a solvent, which acts to dissolve the starting material as well as the novel phosphorus compound produced in the reaction. When this latter procedure is followed, for instance when benzene is used as solvent, the precipitated hydrohalogenide of the base is separated off, washed and the resulting phosphorus compound isolated from the solution thereby obtained by evaporation and recrystallization.

The reaction may be advantageously carried out at a temperature of from about −80° C up to about +60° C. Higher temperatures should only be used in particular instances, as such higher temperatures often lead to undesirable detours in the reaction course and in several cases favor the formation of undesired side products. Temperatures of between ° and 60° C, preferably of between 40° and 60° C, are most conveniently used for carrying out the reaction. The use of increased pressure appears, other than in special instances, to be unnecessary.

If basic acting materials are to be used as acceptors for the hydrogen halide evolved in the reaction, tertiary amines, as for instance, triethylamine or tributylamine are preferred. The basic acting material is generally used in an amount sufficient for the bonding of two moles of hydrogen halide.

Although the ratio of the malonic acid diester to the halogen-phosphorus compound is not critical, it is preferred to react the malonic acid diester to the halogen phosphorus components in a molar ratio of 1 : 1. It has been found to be advantageous to first mix the malonic acid-diester and the base used for bonding the evolved hydrogen halide and thereafter to add the halogen-phosphorus compound to the resulting mixture in a dropwise fashion. According to another suitable procedure the base is introduced into a mixture of the malonic acid-diester and the halogen-phosphorus compound in a dropwise fashion.

In accordance with the invention as phosphorus compound, there are preferably used compounds of trivalent phosphorus containing directly linked to the phosphorus atom at least two halogen atoms capable of reacting with activated hydrogen atoms corresponding to the formula:

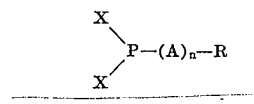

wherein each X represents halogen, preferably chlorine, bromine or iodine, whereby the two X may be the same or different, R represents an aliphatic, cycloaliphatic, heterocyclic or aromatic radical, which may be substituted, the substituent being required to be non-reacting with the halogen atoms linked to the phosphorus atom under reaction conditions, A represents a bridge atom and namely one of oxygen, sulfur, nitrogen and phosphorus, $n$ is an integer having a value of 0 or 1 where the bridge atom is oxygen, and 0, 1 or 2 where the bridge atom is sulfur, nitrogen or phosphorus.

The organic phosphorus compounds prepared according to the process of the invention contain at least one phosphorus atom, which may be present in the trivalent state, a phosphorus to carbon double linkage and at least two carboxylic acid ester groups. They are obtained by reaction of malonic acid-diesters in the presence of a base with compounds of trivalent phosphorus represented by the formula:

wherein each X represents halogen, preferably chlorine, bromine or iodine, wherein the two X may be the same or different, R represents an aliphatic, cycloaliphatic, heterocyclic or aromatic radical, which may be substituted, by a substituent which is non-reacting with the halogen atoms linked to the phosphorus atom.

The group of the novel phosphorus compounds also includes phosphorus compounds, which are obtained by reaction of malonic acid-diester in the presence of a basic reacting material with a compound of trivalent phosphorus represented by the formula:

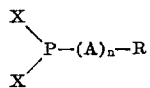

wherein X and R have the significance as set out above, A represents a bridge atom selected from the group of oxygen, sulfur, nitrogen and phosphorus, n is an integer having a value of 1 or 2 where the bridge atom is sulfur, nitrogen or phosphorus.

The novel phosphorus compounds of the invention can also contain, in addition to a phosphorus atom, which may be present in the trivalent state, a phosphorus to carbon double linkage and at least two carboxylic acid ester groups, a second phosphorus atom.

In this case, one phosphorus atom can be present in the trivalent state and one phosphorus atom in the pentavalent state and a phosphorus to carbon double linkage can be present at the penta-valent atom.

In accordance with the invention the trivalent as well as the penta-valent phosphorus atom can carry substituents, which may be aliphatic, cycloaliphatic, heterocyclic or aromatic radicals which may be substituted, the substituents being non-reacting with the halogen atoms linked to the phosphorus atom under the prevailing reaction conditions.

Further in accordance with the invention it has been found that in the novel organic phosphorus compounds containing at least one phosphorus atom, which may be present in the trivalent state, at least two carboxylic acid ester groups, a second phosphorus atom, which may be present in the penta-valent state and a phosphorus to carbon double linkage at the penta-valent phosphorus atom, a phosphorus to phosphorus linkage between the trivalent and the penta-valent phosphorus atom is possible, wherein the trivalent as well as the penta-valent phosphorus atom can carry substituents, which may be aliphatic, cycloaliphatic, heterocyclic or aromatic radicals, which in their turn may be substituted by substituents non-reactive with the halogen atoms linked to the phosphorus.

In this instance the trivalent as well as the penta-valent phosphorus atom may be part of a five-membered hetero-cyclic ring.

Included within the scope of the novel compounds of the invention are the derivatives of 1,2-diphospha-cyclopentene-(5)-one-(4) having the formula:

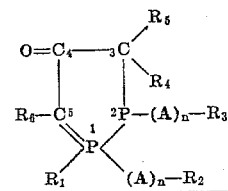

wherein $R_1$ represents an aliphatic, cycloaliphatic, heterocyclic or aromatic radical linked to the nucleus via an oxygen atom, $R_2$ and $R_3$ each represent aliphatic, cycloaliphatic, heterocyclic or aromatic radicals, which may be linked to the nucleus via a bridge atom A selected from the group of oxygen, sulfur, nitrogen, and phosphorus, $n$ is an integer having a value of 0 or 1 if the bridge atom is oxygen and if the bridge atom is sulfur, nitrogen or phosphorus $n$ has a value of 0, 1 or 2, and $R_4$, $R_5$ and $R_6$ each stand for a carboxylic acid ester group.

Due to the presence of a phosphorus atom having a pair of free electrons, the aforesaid compounds are electron donors and therefore are capable of forming complexes with transition metals and compounds of the latter.

The novel compounds prepared by the process of the invention have proved useful as pest controlling agents, as catalyst components as well as intermediates for use in organic-technical synthesis reactions as for instance the complexing reactions just noted.

Of particular importance is the oxidation inhibiting efficiency of the novel compounds, as is seen from the following comparison.

EXAMPLE A

Through 163.3 g n-butyraldehyde, containing dissolved 3.26 g 1-tert.-butoxy-1,22-di-(4'-dimethylaminophenyl)-[1,2-diphospha-cyclopentene-(5)-one-(4)]-tricarboxylic acid-(3,3,5)-tri-tert.-butylester were passed 54 Nl air during 1 hour at ambient temperature.

n-butyrid acid formed:

after 30 minutes 0.33 g after 60 minutes 0.46 g

EXAMPLE B

Through 163.3 g n-butyraldehyde, containing dissolved 3.26 g 1-methoxy-1,2-di-(4'-dimethylaminophenyl)-[1,2-diphospha-cyclopentene-(5)-one-(4)]-tricarboxylic acid-(3,3,5)-trimethylester, were passed 54 Nl air during 1 hour at ambient temperature.

n-butyric acid formed:

after 30 minutes 1.05 g after 60 minutes 1.21 g

EXAMPLE C

Through 163.3 g n-butyraldehyde containing none of the novel phosphorus compounds of the invention were passed 54 Nl air during one hour at ambient temperature.

n-butyric acid formed:

after 30 minutes 17.7 g after 60 minutes 34.1 g

For instance a novel phenyl-substituted phosphorus compound is formed with favorable results if malonic acid diethyl-ester is reacted with phenylphosphine dichloride in presence of a base preferably in an organic solvent and the phosphorus compound thereby formed is separated from the hydrochloric acid salt of the base by fractional crystallization or extraction. Thereby the chemical compound 1-ethoxy-1,2-diphenyl-[1,2-diphospha-cyclo-pentene-(5)-one-(4)]-tricarboxylic acid-(3,3,5)-triethylester is formed.

This phenylsubstituted phosphorus compound proved especially useful as catalyst component.

Furthermore of particular importance is the oxidation inhibiting efficiency as is seen from the following comparison:

Through 159.5 g n-butyraldehyde were passed 31 l air during 30 minutes, whereby 15.6 g butyric acid were formed.

Under similar conditions but with addition of 3.2 g of 1-ethoxy-1,2-diphenyl-[1,2-diphospha-cyclopentene-(5)-one-(4)]-tricarboxylic acid-(3,3,5)-triethylester only 2 g butyric acid were formed.

Melting point of the compound: 114° C. The compound is soluble in benzene, acetone, acetic acid ethylester, but difficult to dissolve in benzine, ether, alcohol.

It shows the adsorption bands at:

| | |
|---|---|
| 692 cm$^{-1}$ | 1305 cm$^{-1}$ |
| 717 " | 1362 " |
| 744 " | 1390 " |
| 757 " | 1442 " |
| 768 " | 1635 " |
| 958 " | 1735 " |
| 1025 " | 1765 " |
| 1112 " | 3000 " |
| 1230 " | |

EXAMPLE 1

202 g triethylamine were added to a solution of 213 g p-chlorophenylphosphine dichloride and 160 g malonic acid-diethylester in 1,000 ml benzene, dropwise under stirring at a temperature of 50° C. The mixture was stirred for a further 2 hours, precipitated triethylamine hydrochloride was separated off by filtration. The remaining filtrate was evaporated, whereby colorless crystals were formed which were washed with ether and recrystallized from absolute methylalcohol.

| | | | | | |
|---|---|---|---|---|---|
| Melting point | : 114 to 115°C | | | | |
| Yield | : 190 g | | | | |
| Analysis | : $C_{26}H_{28}O_8P_2Cl_2$ | C | H | Cl | P |
| | Calc. | 51.9 | 4.66 | 11.8 | 10.3 |
| | Det. | 50.69 | 4.72 | 12.20 | 11.93 |
| Molecular weight : | (vapor pressure-osmometric determined) | | | | |
| Calc. 601 | det. 558 | | | | |

EXAMPLE 2

35 g N-methylaniline-N-phosphine dichloride and 27 g malonic acid-diethylester were dissolved in 330 ml benzene. 38 g triethylamine were then added to the resulting solution under a blanket of nitrogen at 50° C. The reaction mixture was stirred for 2 hours and the precipitated triethylamine hydrochloride was separated off by filtration. The filtrate was concentrated to about one third of its volume and 330 ml absolute ether added thereto. A highly viscous liquid was separated by stratification and was decanted from the ether.

| | | | | | |
|---|---|---|---|---|---|
| Yield : | 43 g | | | | |
| Analysis : | $C_{28}H_{36}O_8P_2N_2$ | C | H | N | P |
| | Calc. | 56.9 | 6.1 | 4.75 | 10.5 |
| | Det. | 56.10 | 7.14 | 4.50 | 9.30 |
| Molecular weight : | (vapor pressure-osmometric determined) | | | | |
| Calc.: 590 | Det.: 543 | | | | |

EXAMPLE 3

19.3 g p-tolyl-phosphine dichloride and 16.2 g malonic acid diethylester were dissolved in 200 ml benzene. A solution of 20.2 g triethylamine in 100 ml benzene was added thereto at 50° C in a nitrogen atmosphere under stirring. After 2 hours any precipitated triethylamine hydrochloride was separated off by suction and the resulting filtrate concentrated. The colorless crystals which remain, were washed with ether and recrystallized from absolute methylalcohol.

| | | | | |
|---|---|---|---|---|
| Melting point | : 114°C | | | |
| Yield | : 15.4 g | | | |
| Analysis | : $C_{28}H_{34}O_8P_2$ | C | H | P |
| | Calc. | 60.0 | 6.12 | 11.05 |
| | Det. | 59.40 | 6.27 | 10.88 |
| Molecular weight: | (vapor pressure-osmometric determined) | | | |
| Calc. 560 | Det. 508 | | | |

The individual chemical compounds prepared on the basis of examples 1 to 4 are designated in the attached Table by the following numbers:

Example 1 = 2
Example 2 = 8
Example 3 = 3

The additional compounds listed in the table were prepared as hereinafter indicated:

0.2 mols triethylamine were added to about 0.1 mol of the compounds as set out in column 1 of the table, dissolved in about a five fold amount by weight benzene, dropwise under a nitrogen atmosphere at 50° C with stirring. Thereafter the reaction mixture was stirred for 2 hours and the precipitated triethylamine hydrochloride separated off by filtration. The solvent was distilled off and the remaining reaction product either washed with ether and recrystallized from absolute methyl alcohol or, if it was a liquid, purified according to conventional methods.

TABLE

Reactor products analysis

| Reactants | Sum formula | Calculated | | | | | | Determined | | | | | | Chemical designation |
|---|---|---|---|---|---|---|---|---|---|---|---|---|---|---|
| | | C | H | P | N | Cl | Mg | C | H | P | N | Cl | Mg | |
| 1. Phenylphosphine dichloride plus malonic acid di-ethylester. | $C_{20}H_{30}O_8P_2$ | 58.6 | 5.64 | 11.64 | | | 532 | 58.20 | 5.92 | 11.69 | | | 532 | 1-ethoxy-1,2-diphenyl-1,2-diphospha-cyclopentene-(5)-one-(4)-tricarboxylic acid-(3,3,5)-triethylester. |
| 2. p-Chloro-phenylphosphine-dichloride plus malonic acid diethylester. | $C_{20}H_{28}O_8P_2Cl_2$ | 51.9 | 4.66 | 10.30 | | 11.8 | 601 | 50.69 | 4.72 | 11.93 | | 12.20 | 558 | 1-ethoxy-1,2-di-(4'-chlorophenyl)-1,2-diphospha-cyclopentene-(5)-one-(4)-tricarboxylic acid-(3,3,5)-triethylester. |
| 3. p-Tolyl-phosphine-dichloride plus malonic acid diethylester. | $C_{28}H_{34}O_8P_2$ | 60.0 | 6.12 | 11.05 | | | 560 | 59.40 | 6.27 | 10.88 | | | 508 | 1-ethoxy-1,2-di-(4'-methylphenyl)-1,2-diphospha-cyclopentene-(5)-one-(4)-tricarboxylic acid-(3,3,5)-triethylester. |
| 4. p-Dimethylaminophenyl-phosphine plus malonic acid-diethylester. | $C_{30}H_{40}O_8P_2N_2$ | 58.25 | 6.47 | 10.05 | 4.53 | | 618 | 58.55 | 6.82 | 9.65 | 4.69 | | 578 | 1-ethoxy-1,2-di-(4'-dimethylaminophenyl)-1,2-diphospha-cyclopentene-(5)-one-(4)-tricarboxylic acid-(3,3,5)-triethylester. |
| 5. p-Fluoro-phenylphosphine dichloride plus malonic acid diethylester. | $C_{28}H_{28}O_8P_2F_2$ | 54.93 | 4.93 | 10.90 | | | 568 | 54.45 | 4.60 | 9.85 | | | 530 | 1-ethoxy-1,2-di-(4'-fluorophenyl)-1,2-diphospha-cyclopentene-(5)-one-(4)-tricarboxylic acid-(3,3,5)-triethylester. |
| 6. o-Tert.-butyl-phenoxy-phosphine dichloride plus malonic acid-diethylester. | $C_{34}H_{40}O_{10}P_2$ | 60.4 | 6.8 | 9.17 | | | 676 | 61.20 | 6.65 | 8.49 | | | 508 | 1-ethoxy-1,2-di-(2'-tert.-butyl-phenoxy)-1,2-diphospha-cyclopentene-(5)-one-(4)-tricarboxylic acid-(3,3,5)-triethylester. |
| 7. 2,5-dimethyl-phenylphosphine dichloride plus malonic acid-diethylester. | $C_{30}H_{38}O_8P_2$ | 61.2 | 6.46 | 10.55 | | | 588 | 61.40 | 6.55 | 10.44 | | | 496 | 1-ethoxy-1,2-di-(2',5'-dimethylphenyl)-1,2-diphospha-cyclopentene-(5)-one-(4)-tricarboxylic acid-(3,3,5)-triethylester. |
| 8. N-methylaniline-N-phosphine dichloride plus malonic acid-diethylester. | $C_{28}H_{30}O_8P_2N_2$ | 56.9 | 6.10 | 10.5 | 4.75 | | 590 | 56.10 | 7.14 | 9.30 | 4.50 | | 543 | 1-ethoxy-1,2-di-(N-methylanilino)-1,2-diphosphacyclopentene-(5)-one-(4)-tricarboxylic acid-(3,3,5)-triethylester. |
| 9. Phenylphosphine dichloride plus malonic acid dimethylester. | $C_{22}H_{22}O_8P_2$ | 55.45 | 4.62 | 13.02 | | | 476 | 55.0 | 4.80 | 12.47 | | | 476 | 1-methoxy-1,2-diphenyl-1,2-diphospha-cyclopentene-(5)-one-(4)-trimethylester. |
| 10. Phenylphosphine dichloride plus malonic acid di-tert.-butylester. | $C_{34}H_{46}O_8P_2$ | 63.4 | 7.14 | 9.62 | | | 644 | 62.7 | 7.34 | 9.23 | | | 593 | 1-tert.-butoxy-1,2-diphenyl-1,2-diphospha-cyclopentene-(5)-one-(4)-tricarboxylic acid-(3,3,5)-tri-tert.-butylester. |
| 11. p-Dimethylamino-phenylphosphine-dichloride plus malonic acid-di-tert.-butylester. | $C_{38}H_{56}O_8P_2N_2$ | 62.47 | 7.67 | 8.49 | 3.84 | | 730 | 62.46 | 8.07 | 8.26 | 4.40 | | 638 | 1-tert.-butoxy-1,2-di-(4'-dimethylamino-phenyl)-1,2-diphospha-cyclopentene-(5)-one-(4)-tricarboxylic acid-(3,3,5)-tri-tert.-butylester. |
| 12. Ethylphosphine dichloride plus malonic acid-diethylester. | $C_{16}H_{30}O_8P_2$ | 49.5 | 6.88 | 14.21 | | | 436 | 50.45 | 7.04 | 13.70 | | | 392 | 1-ethoxy-1,2-diethyl-1,2-diphospha-cyclopentene-(5)-one-(4)-tricarboxylic acid-(3,3,5)-triethylester. |
| 13. n-Butyl-phosphine-dichloride plus malonic acid-diethylester. | $C_{22}H_{38}O_8P_2$ | 53.6 | 7.73 | 12.6 | | | 492 | 52.6 | 7.40 | 11.80 | | | 405 | 1-ethoxy-1,2-di-n-butyl-1,2-diphospha-cyclopentene-(5)-one-(4)-tricarboxylic acid-(3,3,5)-triethylester. |

A list of several intensive adsorption bands in the IR-spectrum [cm$^{-1}$] of the compounds quoted in the table and the respective melting points of these compounds (where solid products are involved) are hereinafter set out.

| | Intensive Adsorption Bands in the IR-Spectrum [cm$^{-1}$] | Melting Point [°C] |
|---|---|---|
| 1. | 1765; 1735; 1635; 1442 | — 114 — |
| 2. | 1755; 1720; 1640; 1445 | 114.5 — 115 |
| 3. | 1755; 1725; 1640; 1440 | — 114 — |
| 4. | 1740; 1710; 1620; 1445 | 120 — 121 |
| 5. | 1765; 1725; 1640; 1450 | 75 — 85 |
| 6. | 1750; 1725; 1655; 1440 | — — — |
| 7. | 1760; 1710; 1630; 1440 | 125 — 126 |
| 8. | 1740; 1710; 1650; — | — — — |
| 9. | 1770; 1710; 1635; 1435 | 126 — 130 |
| 10. | 1755; 1730; 1630; 1440 | 98 — 100 |
| 11. | 1750; 1710; 1640; 1450 | 105 — 106 |
| 12. | 1750; 1725; 1650; — | — — — |
| 13. | 1740; 1715; 1610; — | — — — |

What is claimed is:

1. 1,2-diphosphacyclopentene-(5)-one-(4) of the formula:

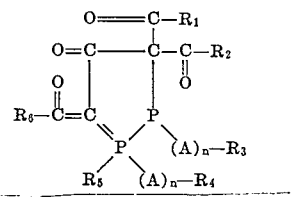

wherein:
$R_1$, $R_2$, $R_5$ and $R_6$ is each an alkoxy group;
$R_3$ and $R_4$ is each an alkyl, phenyl, or halo-alkyl amino- or alkyl phenyl radical;
each A is oxygen or alkyl substituted imido; and
each $n$ is zero or one.
with the proviso that when $R_1$, $R_2$, $R_5$ and $R_6$ are each ethoxy —(A)$_n$ —$R_3$ and —(A)$_n$ —$R_4$ are not each phenyl.

2. 1,2,-diphosphacyclopentene-(5)-one-(4) as claimed in claim 1, of the formula:

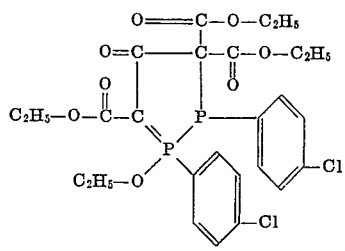

having a molecular weight of 601 and melting point of 114°-115° C.

3. 1,2-diphosphacyclopentene-(5)-one-(4) as claimed in claim 1 of the formula:

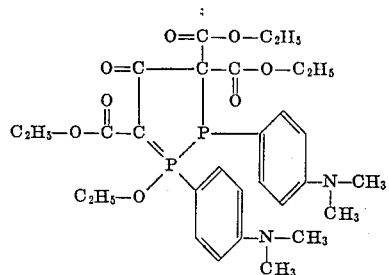

having a molecular weight of 618 and a melting point of 120° to 121° C.

4. 1,2-diphosphacyclopentene-(5)-one-(4) as claimed in claim 1 of the formula:

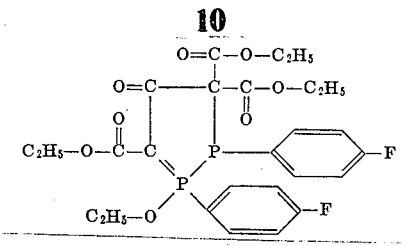

having a molecular weight of 568 and a melting point of 75° to 85° C.

5. 1,2-diphosphacyclopentene-(5)-one-(4) as claimed in claim 1 of the formula:

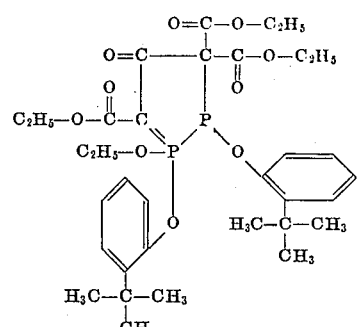

having a molecular weight of 676.

6. 1,2-diphosphacyclopentene-(5)-one-(4) as claimed in claim 1 of the formula:

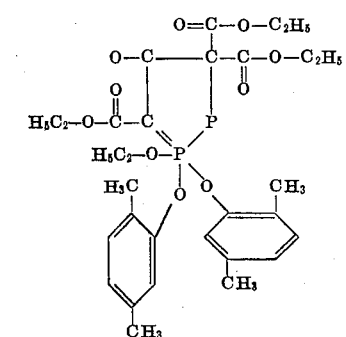

having a molecular weight of 588 and a melting point of 125°-126° C.

7. 1,2-diphosphacyclopentene-(5)-one-(4) as claimed in claim 1 of the formula:

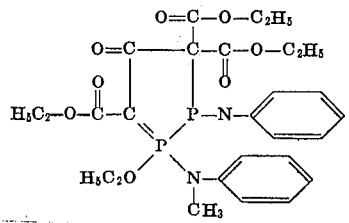

having a molecular weight of 590.

8. 1,2-diphosphacyclopentene-(5)-one-(4) as claimed in claim 1 of the formula:

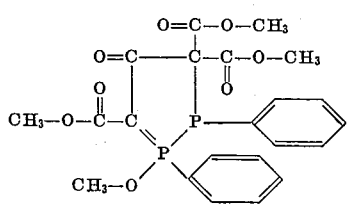

having a melting point of 126° to 130° C, and a molecular weight of 476.

9. 1,2-diphosphacyclopentene-(5)-one-(4) as claimed in claim 1 of the formula:

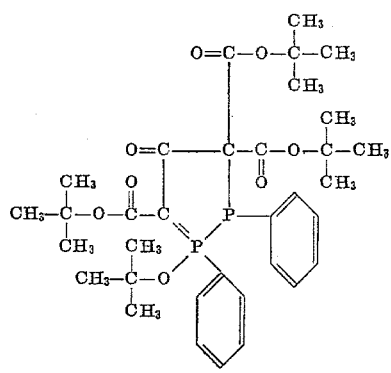

having a melting point of 98° to 100° C and a molecular weight of 644.

10. 1,2-diphosphacyclopentene-(5)-one-(4) as claimed in claim 1 of the formula:

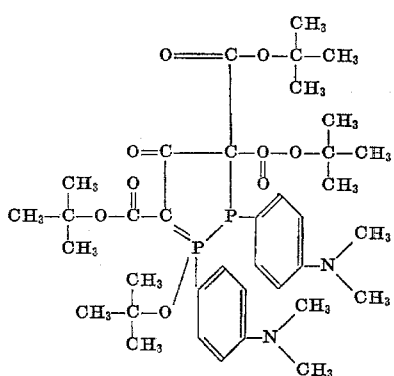

having a melting point of 105° to 106° C and a molecular weight of 730.

11. 1,2-diphosphacylcopentene-(5)-one-(4) as claimed in claim 1 of the formula:

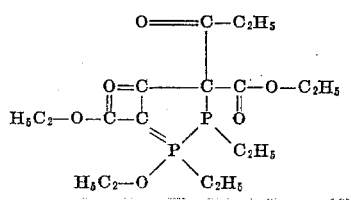

having a molecular weight of 436.

12. 1,2-diphosphacylcopentene-(5)-one-(4) as claimed in claim 1 of the formula:

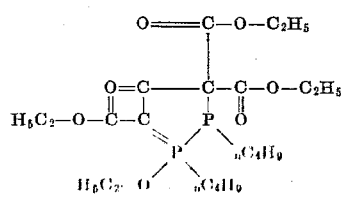

having a molecular weight of 492.

13. 1,2-diphosphacyclopentene-(5)-one-(4) as claimed in claim 1 of the formula:

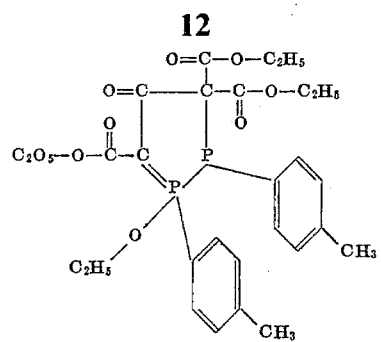

having a molecular weight of 560 and a melting point of 114° C.

14. Process of producing compounds of the formula:

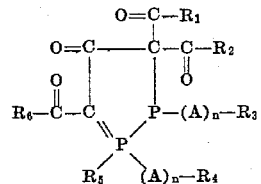

which comprises reacting:

a. a first phosphorus halide of the formula:

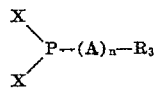

b. a second phosphorus halide of the formula:

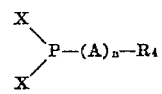

c. a first malonic acid derivative of the formula:

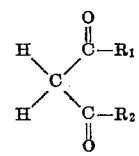

and, d. a second malonic acid derivative of the formula:

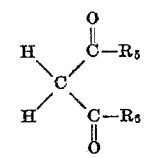

at −80° to +60° C,
where:
$R_1$, $R_2$, $R_5$ and $R_6$ is each an alkoxy group;
$R_3$ and $R_4$ is each an alkyl, phenyl, or halo-, alkyl amino-, or alkyl-phenyl, radical which is non-reactive with respect to said X;
each A is oxygen or alkyl substituted imido;
each $n$ is zero or one; and
each X is chlorine, bromine or iodine, and recovering the 1,2 diphosphacyclopentene-(5)-one-(4) thereby produced, with the proviso that when said malonic acid diester is malonic acid diethylester said trivalent phosphorus compound is not phenyl phosphine dichloride.

15. Process as claimed in claim 14 including reacting hydrogen halide evolved in said reaction with a basically reacting material.

16. Process as claimed in claim 14 including passing an inert gas sweep through said reaction mixture whereby removing evolved hydrogen halide therefrom.

17. Process as claimed in claim 14 carried out in the presence of a reaction medium which is a solvent for the reactants and a non-solvent for the reaction product.

18. Process as claimed in claim 17, including using hexane as the reaction medium and extracting the reaction product with benzene.

19. Process as claimed in claim 15 wherein said first and second phosphorus halide are the same, said first and second malonic acid derivatives are the same and said basically reacting compound is triethylamine.

20. Process as claimed in claim 19, wherein the mole ratio of phosphorus halide to malonic acid derivative is 1:1.

* * * * *

CERTIFICATE OF CORRECTION

Patent No. 3,681,477          Dated August 1, 1972

Inventor(s) Gunter Bergerhoff et al.

It is certified that error appears in the above-identified patent and that said Letters Patent are hereby corrected as shown below:

Col. 2, line 14, change "°" to --O--.

Col. 4, line 40, change "1,22" to --1,2--.

Cols. 7 and 8, in the Table, opposite 593, change "phenyl" to --diphenyl--.

Col. 10, Claim 7, line 52, attach -- -CH$_3$ -- to "N".

Col. 11, line 31, change "-C-O-O-C-" to -- -C-C-O-C- --.

Col. 11, line 45, change "O=C-C$_2$H$_5$" to -- O=C-O-C$_2$H$_5$ --.

Col. 11, lines 61 and 62, change " O=C- " to

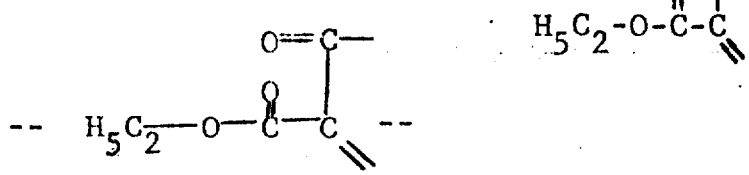

Col. 12, line 5, change "C$_2$O$_5$-" to -- C$_2$H$_5$- --.

Signed and sealed this 9th day of January 1973.

(SEAL)
Attest:

WARD M. FLETCHER, JR.
Attesting Officer

ROBERT GOTTSCHALK
Commissioner of Patents